Apr. 10, 1923.
W. L. MONTAGUE ET AL
1,451,624
SPROCKET CHAIN
Filed Sept. 24, 1921
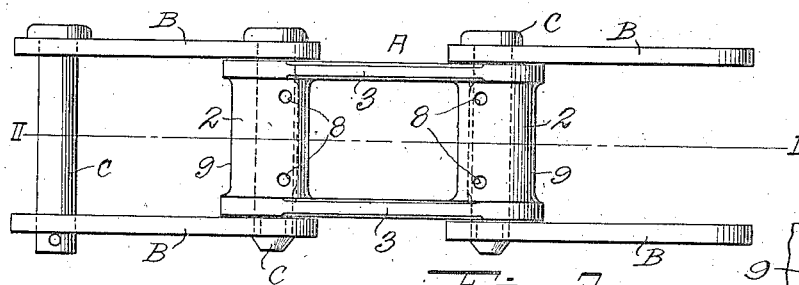
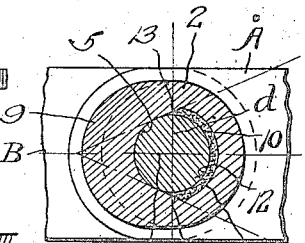
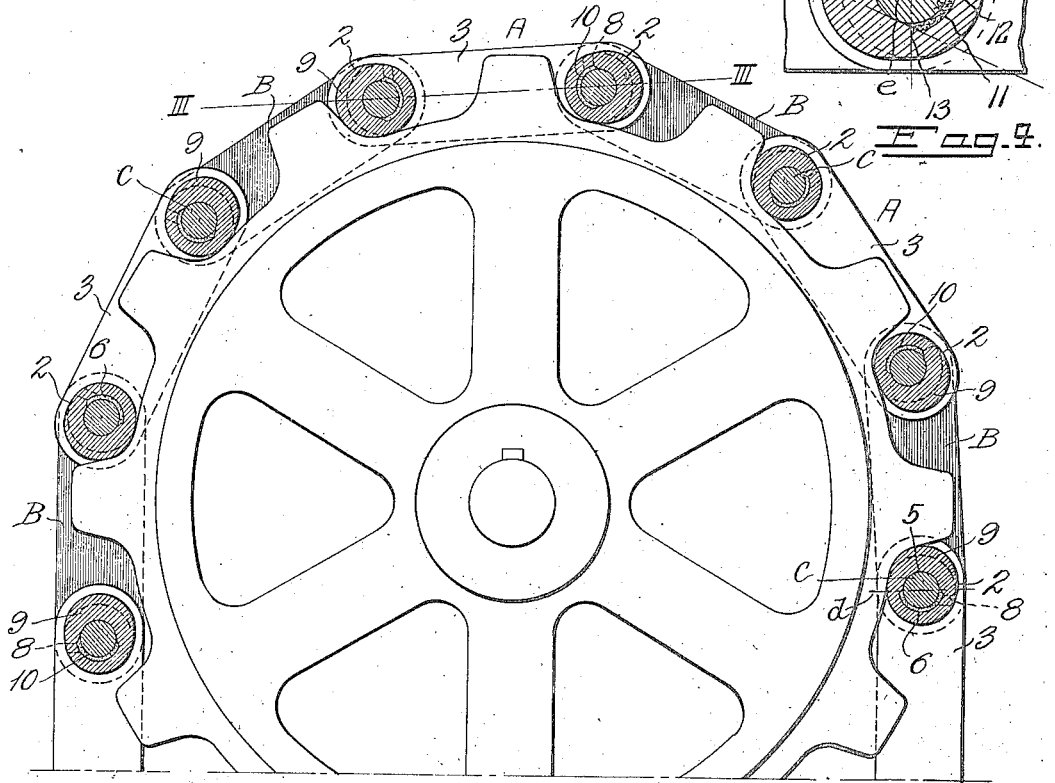
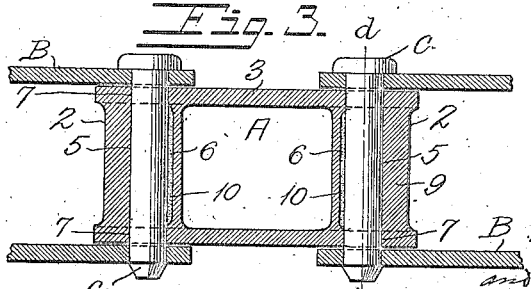
Inventor
William L. Montague
and Brinton Nelser
By John S. Barker
Attorney Patented Apr. 10, 1923.

1,451,624

UNITED STATES PATENT OFFICE.

WILLIAM L. MONTAGUE AND BRINTON WELSER, OF MILWAUKEE, WISCONSIN, ASSIGNORS TO CHAIN BELT COMPANY, OF MILWAUKEE, WISCONSIN, A CORPORATION OF WISCONSIN.

SPROCKET CHAIN.

Application filed September 24, 1921. Serial No. 502,871.

*To all whom it may concern:*

Be it known that we, WILLIAM L. MONTAGUE and BRINTON WELSER, citizens of the United States, residing at Milwaukee, in the county of Milwaukee and State of Wisconsin, have invented certain new and useful Improvements in Sprocket Chains, of which the following is a specification.

Our invention relates to sprocket chains employed for conveying and power transmitting purposes.

In using such chains where the material being handled is of a gritty, corrosive, sticky or cementing nature, it is necessary that the chains possess great strength and good wearing qualities. Experience has demonstrated that when sprocket chains as usually constructed are used in cement mills, fertilizing plants and other industries where material of the nature just above suggested is handled, they wear rapidly and often become stiff so that they fail to flex as they should, with the result that their engagement with the sprocket wheels is imperfect, often resulting in the chains climbing off, or becoming disengaged therefrom.

This is especially true where material which is very sticky, such as acid phosphate, is being handled, and more particularly when handled relatively hot, as it often is. The material works into the chain joints, between the links and the connecting pintles, and there hardens. If the chain be at rest the material will quickly cement together the articulating parts, uniting, for instance, the pintles with the walls of the tubular cross bars through which they pass with the result that the chain becomes very stiff in the joints, often requiring the use of a sledge hammer to loosen them and to straighten the chain, which is hard on the chains and the attachments which they carry, such as elevating buckets. In the case of repairs on chains as usually constructed considerable difficulty is met with due to this cementing together mentioned above. The present invention has for its object to so construct the chain that it may be used under the trying conditions just suggested and still maintain its flexibility, and that it shall have great strength and good wearing qualities and possess other advantages which will be hereinafter pointed out.

In the accompanying drawings where our invention is illustrated—

Figure 1 is a plan view of a section of a chain of well-known type to which is applied our invention.

Fig. 2 is a longitudinal section taken on the line II—II of Fig. 1.

Fig. 3 is a horizontal section taken on the line III—III of Fig. 2.

Fig. 4 is a transverse sectional view through one of the end bars of a link, drawn on a larger scale than the other views.

In the accompanying drawings A represents a unitary or one-piece link formed with tubular end bars 2, 2 connected by side bars 3, 3. Duplicate links A, A are united by the connecting side plates B, B and pintles C, the pintles passing through holes formed in the ends of the connecting side plates B, in which they are held against rotation, and the tubular end bars of the links A in which they are free to turn. This type of chain is well-known and in common use and has been selected merely for the purpose of illustrating our invention, it being understood, that the invention is not limited in its useful applications to this particular type of chain, although it is well adapted for embodiment therein.

The type of chain shown is now largely used in cement mills and fertilizing plants because of its strength and wearing qualities, but as above intimated, in many conditions of use the fine particles of the material being handled get into the articulating parts of the chain and rapidly cut them out, and certain materials cause the pintles to stick in their seats in the tubular end bars of the links A, making the chain stiff, often to such a degree as to render it inoperative until the joints have been loosened. Since the pintles are usually flattened to prevent turning in the side plates any stiffness in the chain flexing joints will have a tendency to break down this locking feature and ultimately permit the pin to turn in the outside side plates instead of the long center bearing and thus reduce the life of the chain because of higher live unit bearing pressures introduced by the breaking down of this locking feature.

In practicing the present invention the bore or opening through the tubular end bar of the link A is relieved or enlarged on one side of the pintle to form a recess into which may be forced a hard grease that will serve both as a lubricant for the joint and as a filler to prevent direct engagement of the pintle with the wall of the bore and the entrance of foreign material into the bore. By the selection of a grease which does not have an affinity for the material handled the entrance of such material is further inhibited. Even when grease is not used the bond established when the chain is left idle, between the pin and the surrounding chamber is readily broken down on the relieved side of the pintle since the material on this side is more readily sheared than two metal surfaces rusted together.

In forming the opening through the end bar 2 a surface is formed, at 5, concentric with the wearing surface of the pintle and of such radius that the pintle fits it. This not only prevents the grease from working out but aids in preventing material getting into the joints.

The opposite portion of the bore is enlarged as indicated at 6. The end portions of the bore, 7, 7, are cylindrical and preferably concentric with the walls 5, such parts being preferably about equal in length to the thickness of the side bars 3 of the link A and in line therewith. When the pintle is in place it fits the parts 7 of the bore closely, and is also in close working engagement with the surface 5, which is on one side of a diametrical line $d$ passing through the pintle, the enlarged portion 6 of the bore being on the opposite side of such line. Thus there is provided for the pintle in the cross bar 2 a full working surface from side to side of the link A, and located on one side the said line $d$, while on the opposite side of such line, and inside of the cylindrical portions 7 of the bore, the inner wall of the cross bar is offset from the face of the pintle, forming a recess, segmental in shape and partly surrounding the pintle. This recess is filled with a hard grease 10. In order that the grease may be introduced into the recess described at the joint of the chain we form holes 8, 8, through the tubular end bar, located near the opposite ends of the enlarged portion of the bore. The grease is forced into the recess 6 through one of the holes 8 by means of a pressure grease gun. The second hole 8 serves as a vent to permit the ready escape of the air as the grease is being forced into place and also as a means for indicating when the recess has been properly filled.

On elevators the head sprocket carries the load and the foot sprocket functions primarily as a guide idler. Therefore good sprocket action, that is the least rubbing action between the sprocket tooth and the cross bar of the chain, is highly desirable. This condition maintains when the driving sprocket tooth is so made as to engage the outside of an end bar 2 of a block link A, poor sprocket action on the head wheel being obtained when the said tooth engages the inside side of the end bar. Also the enlargement of the bore through the end bar, as illustrated, gives a thinner cross bar on the inside which if this came in contact with the sprocket teeth would wear through sooner than if solid. Hence in a chain with alternate block links A and side plates B if every other tooth is omitted contact could always be secured on the outside of the link, where good sprocket action maintains, instead of the inside. But the advantage of an odd tooth sprocket, that is, having a link engage a different tooth each revolution would thus be sacrificed. The advantage of offset couplers would also be sacrificed. Therefore to get good sprocket action without omitting any teeth we may thicken the end bars, as indicated at 9, Figs. 1, 2 and 3, on the sides toward the ends of the links. The portions of the cross or end bars thus increased that is to say, the outer or end faces thereof, give good sprocket action since the full effect of the load does not come into play to cause grinding action between the sprocket teeth and the end of the link. The block links seat themselves and all rotation takes place between the pintle and cross bars as the successive links engage with the sprockets in rotating. The inside of the cross bar, where grinding action otherwise would take place, does not have this enlargement and therefore is not in contact with the sprocket tooth, thus all poor sprocket action is eliminated. While this enlargement of the cross bars gives to them a somewhat eccentric circumferential shape, this is not practically objectionable.

The axes of the filling holes 8 are at right angles to a central plane cutting the link A longitudinally. This brings the openings to the holes on the outside of the chain and greatly facilitates the filling of the recesses 6 with lubricant permitting this to be performed while the chain is taut.

A chain such as described has been found to overcome the difficulties herein enumerated incident to handling sticky and corrosive material as it prevents the material from uniting the pintles with the barrels or tubular cross bars of the links to such an extent as to interfere with the practical operation of the chain. This is because only sufficient portions of the surfaces of the pintles and tubular cross bars are permitted to come into engagement to insure good working conditions, the rest of the surfaces being relieved of contact with each other by the enlargement of the bore as has been explained, and any bond established on the relieved side is readily broken by operating. The sticking of the articulating parts of the chain joints is further prevented by the packing of the cavities formed in the cross bars to relieve contact between the pintles and the cross bars, with a hard grease which acts as a binder preventative and which will not run out of the cavity but will remain in place and largely prevent the entrance of the material being handled as well as serve as a lubricant. Furthermore, by making the opening through the cross bar of the link so that it closely fits the pintle at the opposite ends of the opening the opportunity for the material being handled entering the cross bar is largely reduced. These several features are each operative to improve the chain and overcome the difficulties that have been described, and they co-operate to practically overcome the difficulties in using sprocket chains under the conditions that have been stated. By providing the pintle with close fitting seats at the ends of the enlarged opening through the cross bar of the link there is no unusual amount of backlash in the operation of the chain as would be the case were the enlargement 6 of the opening continued entirely through the end bar from end to end. The close pintle-fitting portions of the end bar not only prevent the entrance of foreign material to the enlarged opening in the bar but they prevent the escape of the grease used to fill the opening, and also enable using the chain in a relatively hot material.

It will be seen by reference to the drawings, particularly to Fig. 4 thereof, that the cavity or recess 6, at any transverse section thereof, is bounded on one side by the surface 12 of the cylindrical pintle C and on the opposite side by an inner wall 11, of the hollow end bar 2, that is concentric with the said surface 12 of the pintle; and at its ends by walls 13, 13, connecting the wall 12 with the wall 11, at the opposite ends of the recess 6, which end walls 13 are tangential to the cylindrical surface of the pintle and are so inclined that, if prolonged toward the side 5 of the bore for the pintle through the side bar 2, they would meet on a diametrical line, $e$, that is at right angles to the diametrical line $d$. The preferred angle between these walls 13, if projected until they meet, is between 30° and 60°. This form of grease chamber we have found to give the best results in chains working with material of a corroding nature, such as has been referred to, because without unduly weakening the chain, it carries the chamber 6 somewhat beyond the line $d$ on both sides and thus shortens the surface 5 that directly engages with the pintle and which surface in operation frequently becomes a rust joint. The shortening of this joint will depend of course upon the angle between the opposite surfaces 13, the wider the angle the more the joint is shortened. We have found that if the chamber 6 be extended beyond the line $d$, even if but little, such, for instance, as would be the case should the angle between the projected surfaces 13 be approximately 30°, the rust joints between the pintles and chain links are much more easily broken than where the engaging surface 5 is a full half circle. However, we prefer the arrangement shown where the angle between the converging surfaces 13 is approximately 60°.

What we claim is:—

1. A sprocket chain comprising links having tubular cross bars and connecting cylindrical pintles which pass through the cross bars, the openings through the cross bars having working surfaces shaped to fit the pintles, on the sides toward the ends of the link, and there being on the opposite sides of the pintles cavities adapted to receive grease, the grease cavity in an end bar being bounded on one side by a segment of the surface of the pintle and on the opposite side by an inner wall of the end bar of the link concentric with and offset from the surface of the pintle, and at its ends by inner walls of the end bar, which walls converge at such angles that if projected they would meet, on a line crossing the pintle diametrically, on that side of the link on which is the bearing surface for the pintle, whereby the grease cavity is extended beyond a diametrical line crossing the pintle at right angles to the diametrical line first mentioned, substantially as and for the purposes set forth.

2. A chain such as described in claim 1 in which the angle between the projected surfaces in which lie the end walls of the grease cavity is between 30° and 60°.

3. A sprocket chain comprising links having side bars and tubular cross bars uniting them, and connecting cylindrical pintles which pass through the cross bars, the openings through the cross bars having surfaces, toward the ends of the links, shaped to fit the pintles, each of a circumferential extent approximating a semi-cylinder so as to give full working bearing between pintle and cross bar, and of a length equal to the full width of the chain link-portions of the openings immediately adjacent to the outer sides of the link being cylindrical and closely fitting the pintles, and the walls of the openings on the sides of the pintles opposite the said working bearing surfaces being offset from the pintles to form cavities adapted to receive grease, the ends of such cavities being closed by the metal of the links immediately adjacent to the said cylindrical end portions of the openings.

WILLIAM L. MONTAGUE.
BRINTON WELSER.